Sept. 6, 1960    H. F. HILD ET AL    2,951,436
TOASTER STRUCTURE
Filed Jan. 6, 1955    3 Sheets-Sheet 1
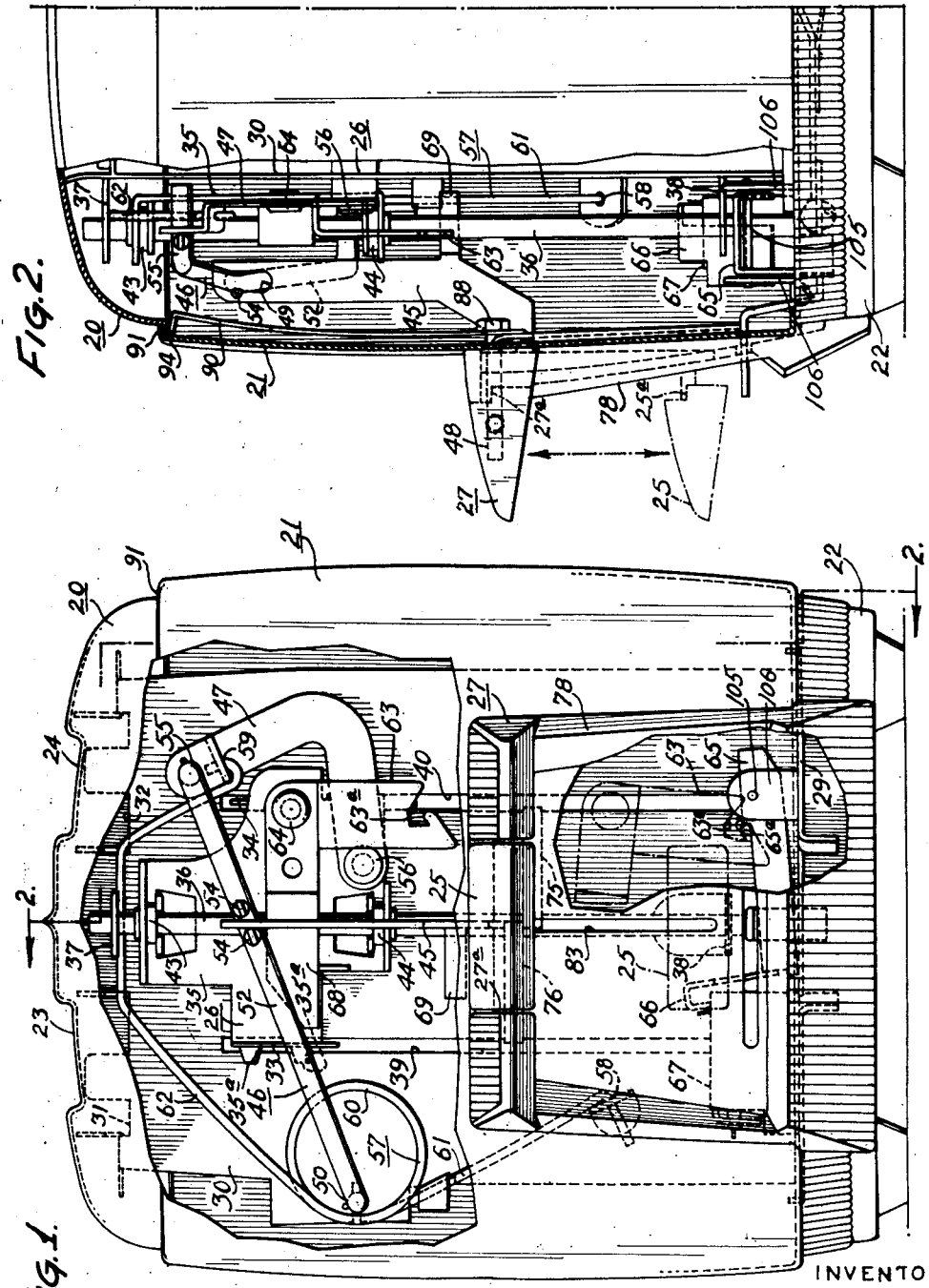
INVENTOR:
HENRY F. HILD
JOHN J. LAWSER
EDWARD P. COLALILLO
BY Howson & Howson
ATTYS.

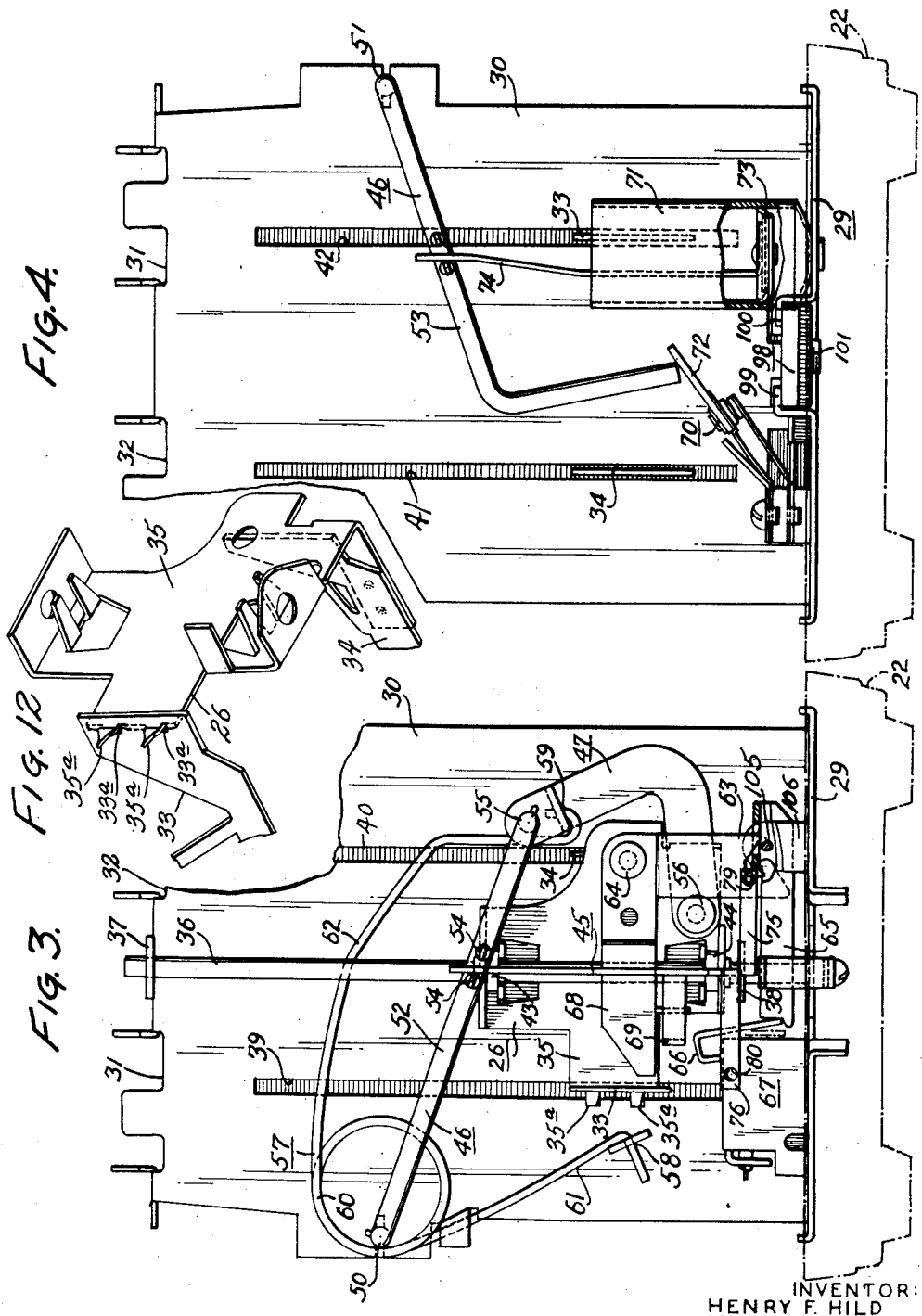

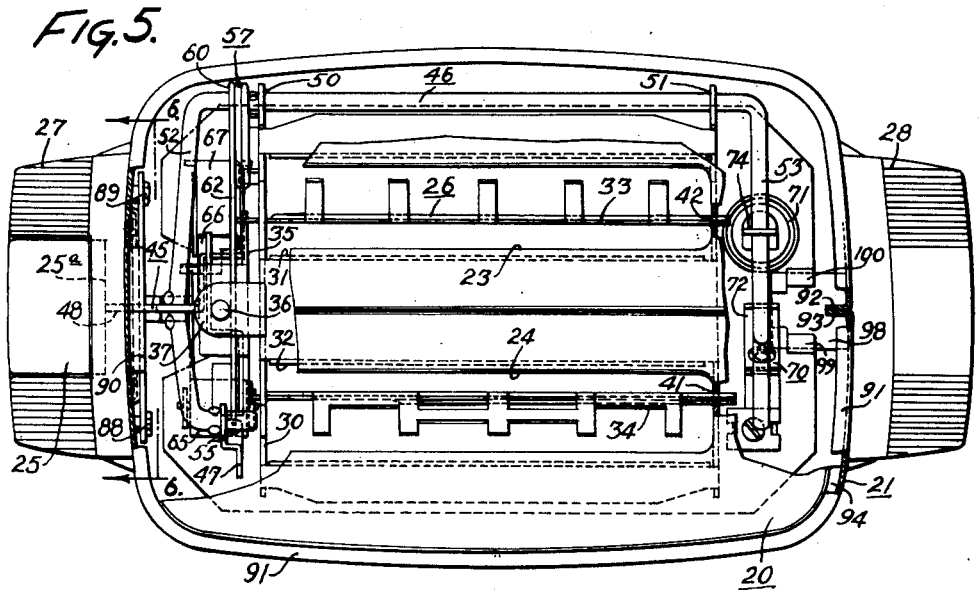
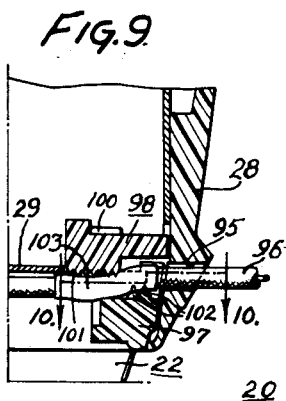
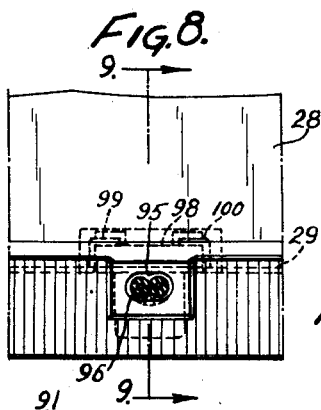
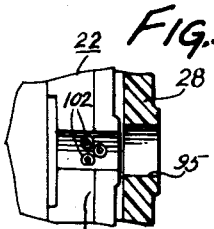
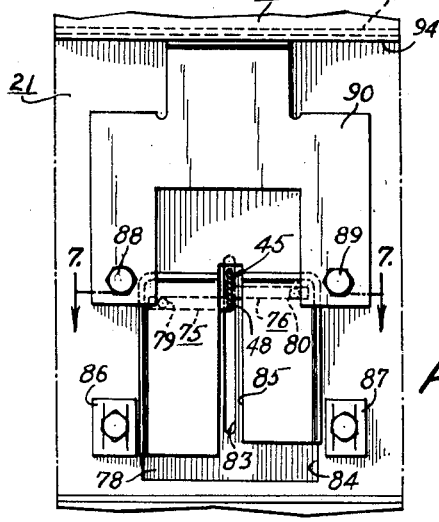
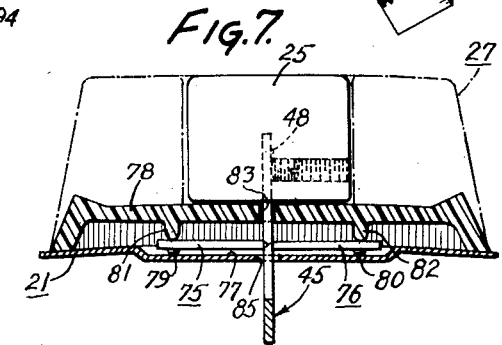
INVENTOR:
HENRY F. HILD
JOHN J. LAWSER
EDWARD P. COLALILLO
BY Howson & Howson
ATTYS.

United States Patent Office 2,951,436
Patented Sept. 6, 1960

2,951,436

TOASTER STRUCTURE

Henry F. Hild, Merion Park, and John J. Lawser, Abington, Pa., and Edward P. Colalillo, Camden, N.J., assignors to Proctor Electric Company, Philadelphia, Pa., a corporation of Pennsylvania Filed Jan. 6, 1955, Ser. No. 480,118

7 Claims. (Cl. 99—391)

The present invention relates to electric bread toasters and, more particularly, to improvements in the constructional features of such toasters.

In one type of automatic bread toaster in extensive use, the user inserts the bread slices into toast well openings at the top of the toaster and then lowers the bread carriage through a manual member so that the bread is lowered into the toasting chamber. After the toasting interval, the toast is automatically ejected so that the slices can be removed from the bread wells. The present trend in toasters of this type is to provide a manually operating member with a relatively short stroke. Thus, the user, by moving the manual member approximately 1⅜″, can lower the bread carriage through its full stroke, which may be approximately 2½″. Various arrangements for this purpose have been devised, but these involve costly constructions and cumbersome mechanisms.

It is a prime object of this invention to provide a toaster carriage system that will be simple in construction and low in cost and will provide the reduced movement of the manual control member to lower the carriage through its full stroke.

A further object of this invention is to provide a novel bread carriage control knob support arrangement.

Other objects and constructional features will be set forth in the description that follows.

In the drawings:

Fig. 1 is an elevational view of the toaster with the casing partially broken away;

Fig. 2 is a partial sectional view taken on line 2—2 of Fig. 1;

Fig. 3 is an end elevational view of the toaster with the casing completely removed;

Fig. 4 is a similar view of the opposite end of the toaster;

Fig. 5 is a plan view of the toaster with portions of the casing removed;

Fig. 6 is a view taken along line 6—6 of Fig. 5, showing some of the detail of the manual carriage control member;

Fig. 7 is a sectional view taken along line 7—7 of Fig. 6, showing some of the details of the control member;

Fig. 8 is a face view of the portion of the toaster where the service cord enters;

Fig. 9 is a sectional view taken on line 9—9 of Fig. 8;

Fig. 10 is a sectional view taken on line 10—10 of Fig. 9;

Fig. 11 is a perspective view of the cord-gripping member; and

Fig. 12 is a detail showing the junctions between the bread racks and their supporting member.

As shown in Figs. 1 and 2, the toaster illustrated has a top casing member 20, a casing body 21, and a base 22 made of suitable insulating material. The top casing member is provided with bread receiving openings 23 and 24, into which bread slices are placed for toasting.

A manual carriage control knob 25 is used for lowering the bread slices into the toasting position. The bread slices are supported on the bread carriage 26 which is linked to the manual knob or finger piece 25 by a mechanism to be described hereinafter.

To permit easy moving of the toaster, even when hot, stationary handle members 27 and 28 (Fig. 5) are provided at opposite ends of the toaster. As may be seen in Figs. 1 and 5, the handle 27 is bifurcated to receive the manual member 25 when the latter is in the raised position. This helps to insure horizontal alignment of member 25 in its raised position. As may be seen in Fig. 2, member 25 has a surface 25a which engages a stop surface 27a on the handle 27. The engagement of these surfaces also helps to insure horizontal alignment of member 25 in its raised position.

Heating elements for toasting the bread slices, grille wires for supporting the bread slices away from the heating elements, and a control mechanism for controlling the length of the toasting cycle, are all provided in the toaster but are not part of the present invention and may be of any suitable character.

The inner support structure of the toaster comprises primarily a chassis support member 29 (Figs. 3 and 4) and an inverted U-shaped frame 30 suitably secured thereto. The upper portion of frame 30 has slots 31 and 32 formed therein to receive the bread slices. The bread carriage 26 (Fig. 5) consists of two bread supporting racks 33 and 34 which are mounted as cantilevers from a plate 35 which is slidably supported on a rod 36. Suitable extensions 37 and 38 (Fig. 2) from the end of frame 30 serve to support the rod 36. The same end of frame 30 is slotted at 39 and 40 Fig. 3) to accommodate the bread racks 33 and 34, while the opposite end of frame 30 is slotted at 41 and 42 (Fig. 4) to guide the free ends of said racks.

To prevent binding during the sliding motion of the carriage, it is preferred to provide loosely mounted slide bushings 43 and 44 made of graphetized bronze composition. These bushings are loosely held between flanges and fingers extending from plate 35. It is further preferred to secure one of the bread racks rigidly to the plate 35, while having the other rack loosely mounted on plate 35 to permit some pivotal movement of the latter rack and thus insure free movement of the carriage. Fig. 12 shows the junction between each of the bread racks and the support. As will be observed, the pivotal effect between rack 33 and support 35 may be secured by providing support 35 with lancings 35a which penetrate slots 33a in the bread rack.

Referring now to Figs. 1 and 3, movement of knob 25 is transmitted to the carriage 26, through a mechanism comprising member 45, lever 46, and link 47. Member 45 has a finger portion 48 to which knob 25 is rigidly secured. The upper end of member 45 is provided with an oval aperture 49 for loose connection to lever 46. As seen in Figs. 3, 4 and 5, lever 46 is U-shaped and is pivoted to one side of the frame 30 at 50 and 51. The arms 52 and 53 of the U-shaped lever extend across the respective ends of the frame. Arm 52 extends through the oval aperture 49 of member 45 so that the latter is loosely connected to said arm. Swedged projections 54 serve to confine the loose connection but permit sufficient relative movement of the interconnected elements. It will be noted that member 45 is disposed substantially centrally of the adjacent end of frame 30 and is connected to lever arm 52 at point intermediate the pivot 50 and the free end of said arm. Link 47 is generally C-shaped and has one end pivotally connected to the free end of lever arm 52 at 55 and the other end pivotally connected to the carriage 26 at 56. It will be seen that movement of knob 25 is amplified through lever arm 52 to cause greater movement of the carriage 26 since the lever arm from the pivot point to the region of knob engagement of the lever is less than that to the link 47.

To bias the carriage to the upper position, a torsion spring 57 is secured to the frame 30 at 58 and to the link 47 at 59. The spring has a coil portion 60 and long extension arms 61 and 62 to give a low spring gradient, thereby providing a substantially constant lifting force for raising the carriage. The force exerted by spring 57 has generally two components; a vertical component tending to raise the carriage and a horizontal component tending to move the link 47 clockwise as viewed in Fig. 3. By placing the spring close to pivot 55 and at a relatively great distance from pivot 56, only a very small horizontal component of spring thrust is transmitted to the slide bushings 43 and 44. The major portion of the horizontal component acts as a tension force in lever arm 52 and is, therefore, ineffective.

To hold the carriage 26 in the toasting position, a latch member 63 (Fig. 3) is pivotally mounted on carriage plate 35 at 64. In the toasting position of the carriage, latch 63 is held by a pivoted catch member 65, rotatably connected by pin 105 to support flanges 106 on the frame. Catch member 65 in turn is prevented from rotating by a latch keeper 66 which forms a part of the armature of an electromagnet 67. At the end of the toasting cycle, the electromagnet is energized by closure of a thermostatic switch (not visible), and the armature of the electromagnet rotates the latch keeper 66 to permit the catch 65 to rotate clockwise as viewed in Fig. 3 to thereby release latch 63. It should be noted that latch member 63 engages catch member 65 close to the pivot of the latter, while the keeper 66 engages catch member 65 relatively remote from said pivot. By this arrangement, the electromagnet is required only to exert a small force to release the latching elements. This arrangement is disclosed and claimed in a copending application of J. J. Lawser, Serial No. 479,004, filed December 31, 1954.

In Fig. 1, the disposition of the latch 63 when the carriage is raised is shown in solid line, while the relative location of the latch 63 with respect to the catch 65 as the latch is about to engage and be held in is shown by the dot and dash outline. It should be noted that latch 63 has a cam surface 63a and catch 65 has an opening 65a, the left-hand edge thereof (see Figs. 1 and 3) being engageable by surface 63a. The engagement of these surface cams the catch 65 downward and rotates the latch 63 counterclockwise about its pivot 64 insuring positive engagement of the latch 63 and catch 65 and the correct positioning of catch 65 in latched engagement with keeper 66. It has been found that the provision of these camming surfaces prevents spurious unlatching even under very rapid lowering of the carriage and also obviates the necessity of a spring to bias the latch. Fig. 3 shows the elements in the latched position. The extension 68 is provided on latch 63 for manual release of the carriage when desired. The loose connection of member 45 with lever arm 52 permits member 45 to be raised and thereby rotate the latch 63 to release the carriage through engagement of extension 68 by an extension 69 of member 45.

As described above, one arm of lever 46 serves to move carriage 26 in response to movement of knob 25. The other lever arm 53 (see Fig. 4) serves to actuate an on-off switch 70 and a dashpot 71. The end portion of lever arm 53 is turned downward to engage an insulating arm 72 and thus close switch 70 when the bread carriage is lowered. The dashpot 71 is secured to chassis 29 and has a piston 73 connected to lever arm 53 through link 74. The latter is loosely connected to arm 53 in the same way that member 45 is connected to lever arm 52, as above described. The dashpot serves to limit the speed of raising of the bread carriage at the end of the toasting operation.

The manner in which the carriage-operating member 45 is guided for vertical movement is shown in Figs. 6 and 7. As may clearly seen in Fig. 7, member 45 is provided with side extensions 75 and 76 for slidable mounting of said member between the recessed portion 77 of the outer casing 21 and skirt portion 78 of stationary handle 27. Dimples 79 and 80 are provided on the respective extensions 75 and 76, and ribs 81 and 82 are provided on skirt 78 to provide closely controlled slide ways for member 45. This arrangement prevents sloppy motion and a poor quality feel by preventing fore and aft motion of knob 25. Sideward lost motion is prevented by a close fitting slot 83 in skirt portion 78 through which the finger 48 extends. As may be seen from Fig. 6, the member 45 is assembled between the skirt 78 and recessed portion 77 by inserting said member into an opening 84 and slot 85 formed in the casing 21. After assembly of member 45, the knob 25 is secured to extension 48. It will be noted that the pivots 50 and 51 for the U-shaped lever 46 are substantially midway of the top and bottom positions of the stroke. It is thus possible to keep the operating knob or finger piece 25 horizontal at the beginning and end of its stroke. The latter is additionally guided and registered at its top position by the sides of the bifurcated handle 27.

The handle 27 with its skirt portion 78 is secured to the casing by friction fasteners 86 and 87 and by screws 88 and 89. The latter also hold a flexible plate 90 (see also Fig. 2) which acts to hold the casing top 20 biased against the flange 91 of the casing body 21. It will be noted that the casing body 21 is formed from a single sheet of material into a generally oval shape having its meeting edges secured as by spot-welding through flanges 92 and 93 (Fig. 5). The casing top 20 has a lip or flange 94 (Fig. 2) which is held by plate 90 and flange 91 at one end of the toaster, and is held by flanges 92, 93 and flange 91 at the other end of the toaster. For the latter purpose, a recess is provided between the top of flanges 92, 93 and the flange 91. By using this method of construction and assembly a very economical and easy to assemble structure is provided.

Referring now to Figs. 8 to 11, it will be seen that the lower portion of handle 28 is provided with an aperture 95 for receiving the service cord 96 which supplies current to the heating elements of the toaster. To prevent the cord from being pulled by abuse or inadvertent action from its terminal moorings (not shown) within the toaster, there is provided a strain relief construction as shown. The latter comprises a lower insulating portion 97 formed integral with the base 22 and an upper insulating member 98. The upper member 98 is held between fingers 99 and 100 formed in the chassis 29. The upper insulating member 98, as seen in Fig. 11, is provided with a corrugated portion 101, while the lower portion 97 (Fig. 10) has formed therein three projections 102. To protect the service cord 96, sleeves 103, made preferably of Fiberglas, are placed over each of the two wires which comprise the service cord. On assembly of the toaster, the service cord is securely held between the projections 102 and the corrugations 101. The amount of pressure on the service cord is controlled by the dimensioning of the fingers 99 and 100.

It will be evident to those skilled in the art that various modifications of the structure herein described are possible, without departing from the invention.

We claim:

1. In a bread toaster, a supporting frame having vertical rod means, a bread carriage slidably supported on said vertical rod means by said frame for vertical movement, a lever pivoted at one side of said frame and extending across an end thereof beyond the center of said end, a connecting link pivotally connected to said carriage and to the free end of said lever, an unitary manually operable member having horizontally and vertically extending portions with a knob mounted on the end of the horizontally extending portion and the vertically extending portion loosely engaging said lever at a point between its pivot and its free end, and means slidably supporting said manually operable member relative to said frame to confine said member to vertical movement.

2. A bread toaster according to claim 1, wherein said lever is pivoted to said frame substantially midway between the uppermost and lowermost positions of said lever.

3. A bread toaster according to claim 1 wherein a spring for urging the bread carriage upwardly has one end connected to the lower part of the supporting frame near the side of the frame at which the lever is pivoted, extends across the frame, and has its other end connected to the lever and link assembly near the pivotal connection of the lever and the link.

4. In a bread toaster, a supporting frame, a bread carriage slidably supported by said frame for vertical movement, a U-shaped lever pivotally mounted at one side of said frame and having its arms extending across the ends of said frame, a connecting link at one end of said frame pivotally connected to said carriage and to the free end of one of the lever arms, a manually-operable member at the same end of said frame slidably mounted relative to said frame for vertical movement and loosely engaging said one lever arm at a point between the pivot and the free end of said arm, such that the point of connection of the link to the free end of the lever is movable between positions above and below the level of the pivotal connection, a switch at the other end of said frame operable by the free end of the other lever arm, and a dashpot at said other end of said frame having a movable element connected to said other lever arm at a point intermediate the pivot and the free end of said arm.

5. In a bread toaster, a supporting frame, a bread carriage slidably supported by said frame for vertical movement, an outer casing or housing enclosing said frame and having a slot in one of its ends, means for actuating said carriage, said means including a manual member loosely engaging other elements of said means and interposed between the said end of said casing and the adjacent end of said frame, a slotted plate secured within the casing to the said end of said casing, side extensions on said member slidably embraced by said casing and said plate, a rear extension on said member extending through said slotted end of said casing, and a front extension on said member projecting through said slotted plate.

6. In a bread toaster according to claim 5, said casing slot being open at its lower end to permit entry of said rear extension, said plate being formed by insulating material, and a finger piece removably secured to said front extension.

7. A bread toaster according to claim 5, including ribs on said plate and projections on said side extensions to provide slideways for said manual member.

References Cited in the file of this patent

UNITED STATES PATENTS

| | | |
|---|---|---|
| 2,106,824 | Bayne | Feb. 1, 1938 |
| 2,193,972 | Lavenberg | Mar. 19, 1940 |
| 2,285,231 | Scharf | June 2, 1942 |
| 2,288,748 | Scharf | July 7, 1942 |
| 2,344,842 | Weeks | Mar. 21, 1944 |
| 2,361,078 | Anderson | Oct. 24, 1944 |
| 2,361,446 | Anderson | Oct. 31, 1944 |
| 2,362,753 | Huck | Nov. 14, 1944 |
| 2,389,434 | Huck | Nov. 20, 1945 |
| 2,389,927 | Parr | Nov. 27, 1945 |
| 2,512,503 | Robinson et al. | June 20, 1950 |
| 2,542,231 | Campbell | Feb. 20, 1951 |
| 2,544,343 | Miller | Mar. 6, 1951 |
| 2,555,697 | Lillyblad et al. | June 5, 1951 |
| 2,591,886 | Snyder | Apr. 8, 1952 |
| 2,622,505 | Olson et al. | Dec. 23, 1952 |
| 2,635,169 | Miller | Apr. 21, 1953 |
| 2,662,466 | Ireland | Dec. 15, 1953 |
| 2,706,445 | Olson et al. | Apr. 19, 1955 |